United States Patent
Krissell et al.

(10) Patent No.: US 7,085,894 B2
(45) Date of Patent: Aug. 1, 2006

(54) SELECTIVELY ACCEPTING CACHE CONTENT

(75) Inventors: Daniel L. Krissell, Morrisville, NC (US); Robert C. Leah, Cary, NC (US); Paul F. McMahan, Apex, NC (US)

(73) Assignee: International Business Machines Corporation, Armonk, NY (US)

(*) Notice: Subject to any disclaimer, the term of this patent is extended or adjusted under 35 U.S.C. 154(b) by 330 days.

(21) Appl. No.: 10/662,210

(22) Filed: Sep. 11, 2003

(65) Prior Publication Data

US 2005/0060497 A1    Mar. 17, 2005

(51) Int. Cl.
    *G06F 12/00*    (2006.01)
(52) U.S. Cl. .................. 711/133; 711/118; 711/158; 709/207; 709/213; 709/214; 709/215; 709/216; 709/217
(58) Field of Classification Search ........... 711/118, 711/133, 158; 709/207, 217
    See application file for complete search history.

(56) References Cited

U.S. PATENT DOCUMENTS

| | | | |
|---|---|---|---|
| 6,260,061 B1 | 7/2001 | Krishnan et al. | |
| 6,567,893 B1 | 5/2003 | Challenger et al. | |
| 6,760,812 B1 | 7/2004 | Degenaro et al. | |
| 6,826,599 B1 | 11/2004 | Shaffer et al. | |
| 2002/0073167 A1* | 6/2002 | Powell et al. | 709/217 |
| 2005/0065950 A1 | 3/2005 | Chaganti et al. | |
| 2005/0086300 A1* | 4/2005 | Yeager et al. | 709/204 |

* cited by examiner

*Primary Examiner*—Kevin Verbrugge
*Assistant Examiner*—Mehdi Namazi
(74) *Attorney, Agent, or Firm*—Marcia L. Doubet (57) ABSTRACT

Improved caching of content at caching proxy ("CP") servers is disclosed. In one aspect, negotiations occur before content is dynamically distributed, whereby an entity such as a Web server selects content and at least one target CP server, and sends a content distribution request to each target, describing the content to be distributed. Preferably, the selection is made by dynamically prioritizing content based on historical metrics. In another aspect, a CP server that receives a content distribution request during these negotiations determines its response to the distribution request. Preferably, content priority of already-cached content is compared to priority of the content described by the content distribution request when making the determination. In yet another aspect, a CP server selectively determines whether to cache content during cache miss processing. Preferably, this comprises comparing content priority of already-cached content to priority of content delivered to the CP server during the cache miss.

27 Claims, 5 Drawing Sheets

```
                                                    302
301 <CacheDistributionContentRequest id="7G9839U">
310 <Size unit = "MB">25.4</Size>
320 <HitRate unit ="hourly">3500</HitRate>
330 <SecurityLevel>classified</SecurityLevel>
340 <ContentType>AVI</ContentType>
    </CacheDistributionContentRequest>
```

```
                                                    502
501 <CacheDistributionContentResponse id="7G9839U">
  510 <Reply value="Rejected">
    520 <ReasonCode>312</ReasonCode>
    530 <Description>Cannot serve classified documents</Description>
      </Reply>
    </CacheDistributionContentResponse>
```

SELECTIVELY ACCEPTING CACHE CONTENT

BACKGROUND OF THE INVENTION

1. Related Inventions

The present invention is related to the following commonly-assigned inventions, which were filed concurrently herewith and which are hereby incorporated herein by reference: U.S. Pat. No. Ser. No. 10/661,955, titled "Negotiated Distribution of Cache Content", and U.S. Pat. No. Ser. No. 10/661,976, titled "Selectively Caching Cache-Miss Content".

2. Field of the Invention

The present invention relates to content caching in a network computing environment, and deals more particularly with techniques for negotiating the dynamic distribution of cache content.

3. Description of the Related Art

Figure 1:
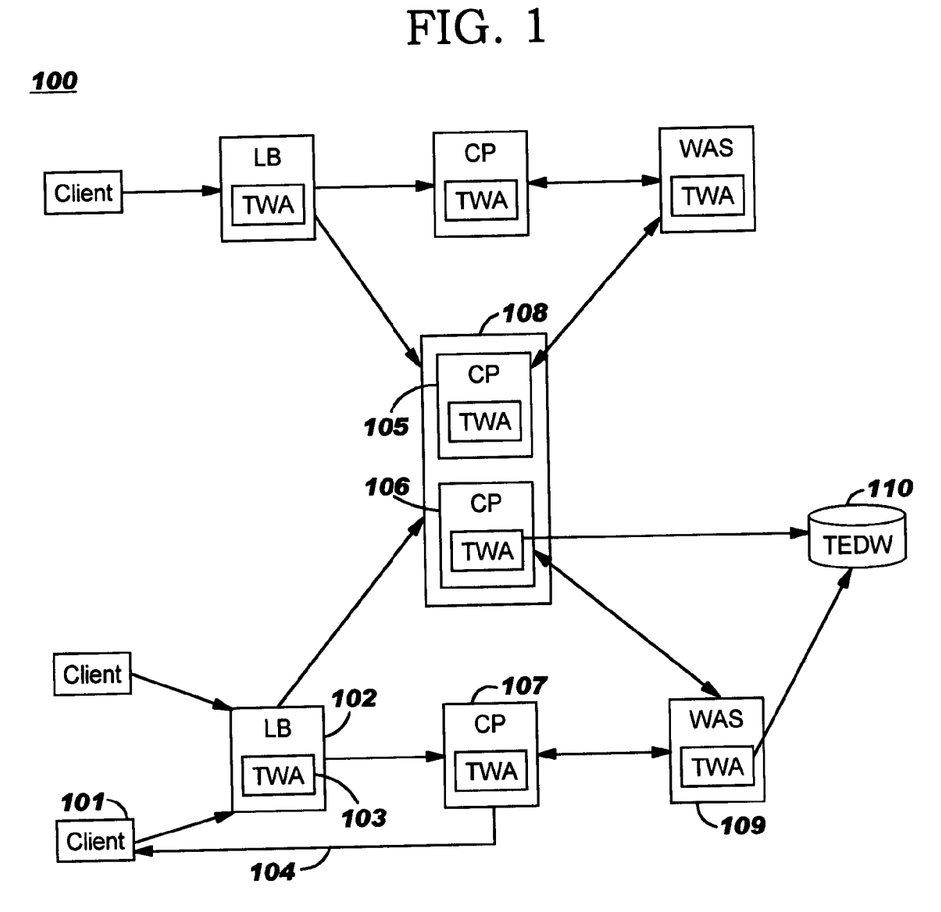
FIG. 1 illustrates a Web infrastructure of the prior art.

Content caching techniques are commonly used in a network environment such as the Internet. A sample network configuration 100 is shown in FIG. 1. When a client 101 requests Web content from a Web/application server ("WAS"), such as WAS 109, the content can be returned more quickly if it is already stored in a cache store that is located near the requesting client 101. For example, in FIG. 1, the request from client 101 may be received at a load-balancing server ("LB") 102, such as the IBM® WebSphere® Edge Server. Unbeknownst to the requesting client, this LB server transparently handles requests for the actual Web/application server, which is located at the "back end" of the Web site. ("IBM" and "WebSphere" are registered trademarks of International Business Machines Corporation.)

An edge server such as the IBM WebSphere Edge Server may actually serve two functions. First, it may serve as a load-balancing server. In this mode, the edge server improves a Web site's performance, scalability, and availability by transparently clustering edge, Web, and application servers. (That is, the edge server serves as a single entry point into the network, from which these various servers are transparently accessible.) The LB server also provides site selection, workload management, and transparent fail-over. Load-balancing servers are distributed throughout the network in locations where they provide convenient customer access, thereby easing network congestion.

The second function an edge server may perform is that of a caching proxy ("CP") server, such as CP 107 in FIG. 1. (The load balancing and caching proxy functions are depicted in FIG. 1 as distinct entities 102, 107 to highlight their functionality. In some cases, these functions may be combined in a single product, such as the IBM WebSphere Edge Server. In other cases, these functions may be provided as separate products.) A CP server improves customer response time by offloading requests for content (such as images, static Web pages, dynamic Web page content, streaming video, and so forth), whereby cached content can be returned 104 directly from the CP server 107 to the requesting client 101 rather than requiring access to a WAS 109 at the back end of the network.

A LB server is aware of the caching proxy servers (e.g., CP servers 105, 106, 107) from which it is able to obtain content. When the LB server 102 receives a content request from client 101, for example, LB server 102 will choose one of the available CP servers such as CP server 107 (using round-robin selection or some other technique), and forward the client's request to that CP server. (Alternatively, the LB server may use redirection to notify the requesting client that the client should request the content directly from the selected CP server.)

Upon receiving a content request, the CP server checks its local cache. If the requested content is found in the cache, this is called a "cache hit", and the CP server returns that content to the requester (for example, as shown by path 104).

If the requested content is not in the cache, this is called a "cache miss". In this case, the CP server requests the content from the Web/application server, such as WAS 109. The WAS returns the content to the CP server, and the CP server then places that content in its local cache and also returns the content to the requesting client.

Optionally, each WAS and edge server can be monitored by a Web site analysis tool, such as the IBM Tivoli® Website Analyzer ("TWA"), which is shown in various locations in FIG. 1. For example, TWA 103 is shown as monitoring LB server 102. Website Analyzer is aware of all content requests arriving at the WAS or edge server, and keeps track of this historical data. ("Tivoli" is a registered trademark of International Business Machines Corporation.)

Another piece of commonly-used software is a central database storage facility such as IBM Tivoli Enterprise Data Warehouse ("TEDW"), which is shown at 110 in FIG. 1. TEDW provides a centralized repository in which historical management systems data can be recorded. Thus, TWA may forward information it gathers to TEDW for recording.

A common task for keeping this Web infrastructure working as it should is the distribution of content to the CP servers. Presently, this is done by one of two techniques: content is distributed responsive to a particular client request during a cache miss (as described above), or a systems administrator manually distributes content to CP servers (typically by reviewing reports of past content requests).

In the cache miss case, the CP server's local cache is always updated, even when this is not optimal. For example, when a cache miss occurs for a rarely-requested piece of content, the CP server's local cache will be updated even though that content is not likely to be requested again. This is a waste of scarce resources.

If the CP server's cache was already full when this rarely-requested content is cached, even more problems are created. The cache-miss content will need to replace some already-cached content. Complex and compute-intensive algorithms may be required to determine which previously-cached content should be replaced. When the cache-miss content is rarely requested, these computations are also wasted overhead. Furthermore, the content that is replaced may result in a cache miss of its own if it is subsequently requested, which will consume additional resources.

In the case where a systems administrator manually distributes content, reports generated from historical data gathered by TWA and stored by TEDW may be used in the administrator's decision-making process. However, this task of deciding which content to distribute, and where it should be distributed, is a never-ending job. When a potential CP server is selected by the administrator, the administrator also has to look at what content is already being served by that CP server to determine if the new content is higher priority than that which is already being served. This is a non-trivial task even in a relatively simple environment, and becomes overwhelming in an enterprise Web infrastructure which may have hundreds of servers and hundreds of thousands of pieces of content.

Accordingly, what is needed are improvements in content distribution to caching proxy servers.

SUMMARY OF THE INVENTION

An object of the present invention is to provide improvements in content distribution to caching proxy servers.

Another object of the present invention to provide techniques for negotiating dynamic distribution of cache content.

A further object of the present invention is to selectively accept content for caching at caching proxy servers.

Yet another object of the present invention is to selectively accept content for caching based on evaluation of content priority.

Still another object of the present invention is to selectively cache content at a caching proxy server during a cache miss.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, in a first aspect the present invention provides techniques for negotiated dynamic distribution of cache content. This preferably comprises selecting candidate content for distribution to a cache store and sending, to the cache store, a request message that describes the candidate content. This aspect preferably further comprises distributing the candidate content to the cache store only if a response message received from the cache store indicates that the cache store accepts the candidate content. The request message sent to the cache store may describe the candidate content using information such as the candidate content's size, type, security classification, and/or hit rate. Optionally, the request message may be sent to a plurality of cache stores. As a further option, an alternative cache store may be selected when the response message to the original request indicates that the original cache store rejects the candidate content. As yet another option, the candidate content may comprise a plurality of files to be distributed as a unit.

In a second aspect, the present invention provides techniques for selectively accepting content for caching, responsive to a negotiation request. This preferably comprises: receiving, at a cache store, a request message inquiring whether the cache store will accept particular content for caching; deciding, responsive to receiving the request message, whether the cache store will accept or reject the particular content; and sending, from the cache store, a response to the request message, wherein the response indicates the cache store's decision This aspect preferably further comprises subsequently receiving the particular content at the cache store only if the response indicated that the cache store's decision was to accept the particular content.

The decision of whether to accept or reject the particular content may be based on a description of the content which is specified in the request message. A hit rate of the content may be evaluated, and the content may be accepted if its hit rate is higher than hit rates of already-cached content. In addition or instead, resources of the cache store may be considered. Content priority associated with the particular content may be compared to priorities associated with already-cached content.

In a third aspect, the present invention provides techniques for selectively caching content when a cache miss occurs. This preferably comprises: receiving, at a cache store responsive to a cache miss, content for which the cache miss occurred; deciding whether the received content should be cached at the cache store, responsive to the receiving step, and only caching it if so; and returning the received content from the cache store to a client that sent a request that caused the cache miss, regardless of the decision as to caching. The decision may be made by evaluating a hit rate associated with the content and deciding whether content having that hit rate may be advantageously cached by the cache store, or whether the hit rate associated with the content is higher than hit rates associated with other content already cached by the cache store (and if so, deciding to accept the content). Content priority associated with the content may be compared to priorities associated with already-cached content at the cache store.

In another aspect, the present invention provides methods of doing business, as will be described herein.

The present invention will now be described with reference to the following drawings, in which like reference numbers denote the same element throughout.

DESCRIPTION OF PREFERRED EMBODIMENTS

The present invention discloses improved techniques for caching content. Preferred embodiments refer to the cache store where content will be (potentially) cached as a caching proxy server. In one aspect, negotiations occur before content is dynamically distributed for caching. In another aspect, a CP server that receives a content distribution request during these negotiations determines how to respond to the request. In yet another aspect, a CP server selectively determines whether to cache content during cache miss processing.

According to preferred embodiments of the first aspect, a WAS dynamically prioritizes content for deployment to a CP server based on historical metrics. A content distribution request is created and is sent to one or more selected CP servers. Each CP server receiving this request determines its response to the distribution request, according to the second aspect. In preferred embodiments of this second aspect, content priority of already-cached content is compared to priority of the content described by a content distribution request when making the determination of whether to accept content for caching. According to preferred embodiments of the third aspect, content priority of already-cached content is compared to priority of content delivered to the CP server during a cache miss, and that cache miss content is selectively cached, depending on the comparison of content priorities.

Preferred embodiments will now be described in more detail with reference to FIGS. 2–6.

In the first aspect, content is selected for distribution to CP servers. Preferably, the selection is made by code operating on a WAS (such as an IBM WebSphere Application Server placed at element 109 of FIG. 1). Alternatively, a WAS might invoke this functionality from another location where the content-selection code is operable. The content selection is preferably made by examining historical access data that reflects run-time requests for content over a representative time period (which may be configurable). This historical access data may be stored in a repository or data management facility such as the IBM Tivoli Enterprise Data Warehouse 110.

Figure 2:
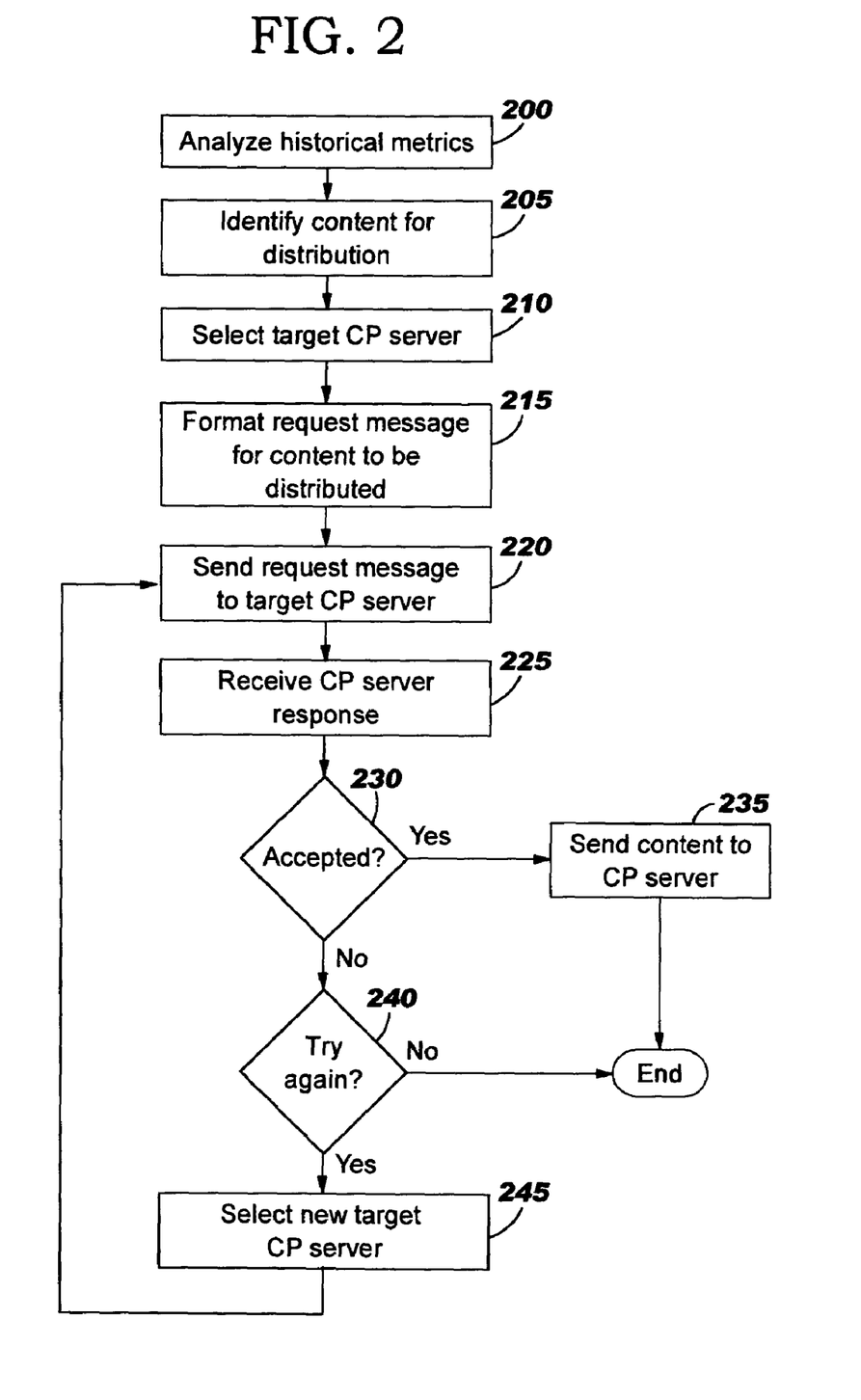
FIG. 2 provides a flowchart showing logic with which dynamic distribution of content may be negotiated, according to preferred embodiments of the present invention.

Block 200 of FIG. 2 represents this evaluation or analysis of historical data. Preferably, metrics such as the content request rate or "hit rate" over a certain period of time are used to determine whether a specific piece of content is a candidate for being distributed to a CP server (such as CP server 107 of FIG. 1).

Once content that is a candidate for distribution is identified (Block 205), the dynamic distribution negotiation begins. At Block 210, the WAS selects, through round-robin or other suitable technique, a CP server which may potentially serve that content. Or, multiple CP servers may be selected, if desired. A content distribution request message is formatted (Block 215) for delivery to each such server. In preferred embodiments, this request message contains a number of details about the specific piece of content. (Refer to the discussion of FIG. 3, below, for more information about content distribution request messages.)

The content distribution request is sent to the target (Block 220), and a response is subsequently received (Block 225). Block 230 then tests whether the response message indicates that the target will accept this content for caching. (FIG. 4, described below, provides more information on how a particular CP server may arrive at the decision reflected in its response.) If the test in Block 230 has a positive result, processing continues at Block 235, where the WAS sends the content to the target CP server for caching. The processing of FIG. 2 then ends.

When the test in Block 230 has a negative result, on the other hand, optional processing may be performed to determine whether there is another CP server to which the candidate content might be distributed. Blocks 240–245 represent this optional processing. At Block 240, a test is made to determine whether to try the negotiations again. If not, then the processing of FIG. 2 ends. Otherwise, a new target CP server is selected (Block 245), after which control returns to Block 220 to send the content distribution request to that new target and await its response.

Note that the optional processing path in FIG. 2 reuses the previously-formatted content distribution request message (i.e., the request created at Block 215). Alternatively, it may be desirable to create a new request message. It may happen, for example, that creation of a new request message enables the WAS to better track a correlation between content distribution requests and the eventual placement of the candidate content. If a new request is to be created, control preferably returns to Block 215 rather than Block 220 following completion of the processing of Block 245. As a further alternative, processing may return to Block 210 following a positive result in Block 240.

The processing in FIG. 2 may be triggered in various ways. As one example, network conditions may be monitored, and occurrence of selected conditions (such as cache miss rates exceeding a configured threshold) may operate as a trigger. As another example, a timer-driven approach may be used as a trigger, whereby operation of the logic of FIG. 2 occurs at specific times or at periodic intervals.

Figure 3:
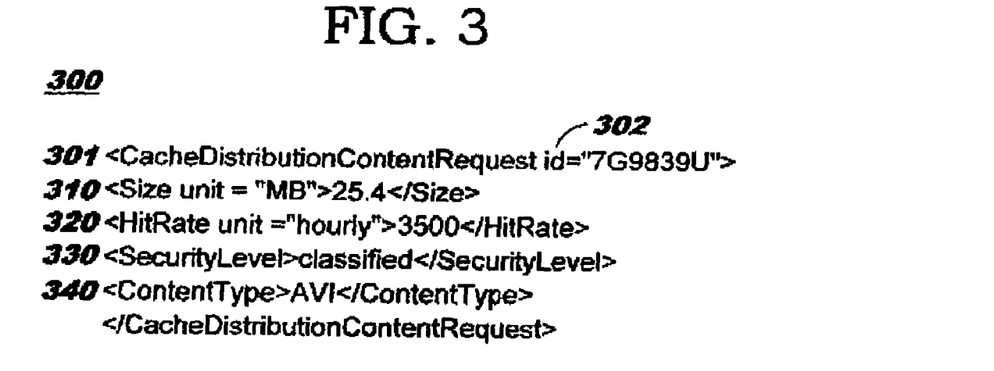
FIGS. 3 and 5 illustrate a sample format and syntax that may be used for content distribution request and response messages, respectively, during the negotiation disclosed herein.

Referring now to FIG. 3, a content distribution request message is shown using a sample format and syntax. As noted above, this request message contains details about the specific piece of content that is a candidate for distribution. These details are referred to herein as a "content descriptor". Preferably, a structured markup language is used for encoding the content descriptor. The sample syntax in FIG. 3 uses the Extensible Markup Language ("XML"), by way of illustration.

According to preferred embodiments, the content descriptor describes the content that may be distributed using information such as the following: (1) the size of the content; (2) the number of requests the WAS is receiving for this content over some period of time; (3) a security level associated with the content; and/or (4) a content type associated with the content. In addition, a content identifier is preferably included in each content descriptor, for later use by the WAS to match an outbound distribution request with an inbound response. (For example, when control reaches Block 235 of FIG. 2, the content identifier enables the WAS to efficiently locate the content that has been accepted for caching at a target CP server.)

With reference to item (2) in the list above, rather than considering the number of requests received by the WAS which is requesting the dynamic content distribution, the WAS may alternatively consider request metrics pertaining to one or more other entities in the network infrastructure. For example, a particular WAS might consider the number of requests received by an edge server and/or requests received by a different WAS (or requests received by multiple edge servers and/or multiple Web/application servers). A pre-emptive approach to content distribution that considers such entities may further improve resource usage. By appropriate use of metrics in the content selection process, a WAS can proactively distribute content to one or more caching locations in the network, in order to improve factors such as network response time for clients, distribution of processing load, and so forth.

As shown in the example of FIG. 3, a content descriptor 300 is encoded in an element which (for purposes of illustration) is named "CacheDistributionContentRequest". See reference number 301. In the example, an attribute 302 of this element is used to specify the content identifier. A child element is used in the sample syntax of FIG. 3 for encoding the content size, hit rate, security level, and content type. These will now be described in more detail.

The "Size" element 310 preferably uses an attribute, which is denoted herein as "unit", to specify the unit of measurement pertaining to this element's value. In the example, the candidate content is 25.4 MB in size. The "HitRate" element 320 also preferably uses an attribute, denoted herein as "unit", to specify the period of time represented by the element's value. In the example, the hit rate of the candidate content is 3500 hits per hour.

If the candidate content has an associated security level, this may be indicated using an element such as "SecurityLevel" 330. A sample value shown in FIG. 3 is "classified". The content type associated with the candidate content may be specified using an element such as "ContentType" 340, and in the example, the value of this element is shown as "AVI" (i.e., content in "audio visual interleaved" format).

The WAS may not be aware of a target CP server's resources. For example, the WAS may not know whether a target CP server has capacity available in its cache for storing the candidate content or whether it can properly protect classified content (including whether the CP server can serve content using a secure access method). Furthermore, in some cases, a single computer hosts more than one CP server (as illustrated by computer 108 in FIG. 1), in which case the hosted CP servers are sharing resources such a storage, memory, and network connections. These CP servers compete for the shared resources, making it infeasible for a WAS to track their available resources at a point in time. Therefore, according to preferred embodiments of the present invention, it is the target CP server that makes an intelligent decision about whether it can, and should, accept the candidate content which the WAS proposes to distribute for caching. The manner in which this decision may be made will now be described in more detail with reference to FIG. 4.

Figure 4:
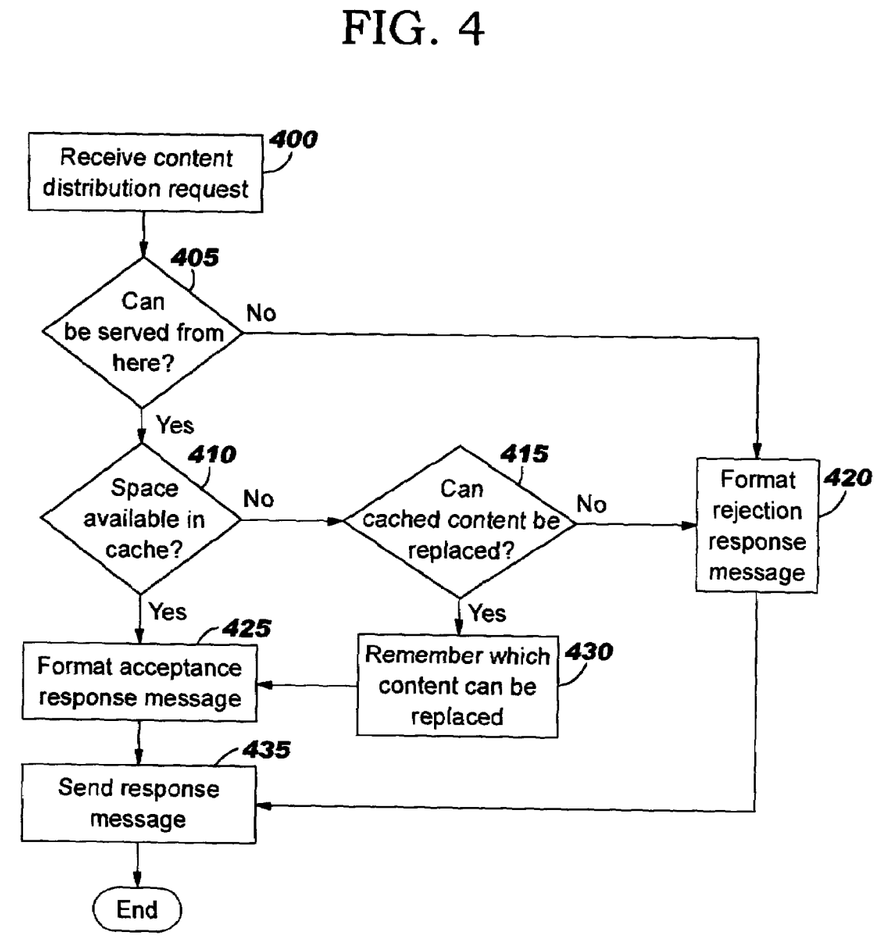
FIG. 4 provides a flowchart showing logic that may be used at a caching proxy server to determine how to respond during negotiations for content distribution, according to preferred embodiments.

At Block 400 of FIG. 4, a CP server receives a content distribution request message. This message preferably contains a content descriptor conveying information such as that described above with reference to FIG. 3. In preferred embodiments, a test is then made at the CP server (Block 405) to determine whether this CP server is capable of serving this content from its cache. Preferably, information from the content descriptor is used in making this decision, along with information such as the CP server's currently-available resources.

Factors that may be used by a CP server to determine whether it can, and should, accept content for caching include one or more of the following:

(1) historical metrics (which may, for example, be stored in a repository such as TEDW 110 in FIG. 1), including metrics pertaining to other content which this CP server has in its cache
(2) whether this CP server is able to cache and/or serve secure content
(3) whether sufficient disk space exists on this CP server to hold the content
(4) whether the CP server can serve content of this type
(5) the reliability of this CP server
(6) this CP server's processor capacity
(7) the current processor load at this CP server
(8) the network capacity at this CP server With reference to item (4) in the list above, for example, it may happen that the candidate content is an Enterprise JavaBean™ ("EJB™"). If the CP server is not running an EJB server, then it cannot serve the EJB to a requester, and it is therefore pointless to accept the EJB for caching. Or, a CP server might not be able to serve content for performance reasons. For example, a CP server that can serve EJBs may have a configured maximum number of allowed EJBs that it can serve from its cache, and it may already have reached this maximum number. If another EJB, with a lower hit rate, is cached, performance may deteriorate beyond what is appropriate. ("Enterprise JavaBean" and "EJB" are trademarks of Sun Microsystems, Inc.)

In the prior art, as discussed earlier, an administrator decides which content is most suitable for distribution to a CP server and then manually causes that content to be distributed. To decide what content to distribute, the administrator typically (among other things) views reports of which content is most popular. The administrator then has to search for a CP server having certain characteristics. These characteristics may include factors such as those presented in the list above. However, because many of these factors vary dynamically (such as the amount of disk space currently available on a CP server), the administrator is presented with a difficult and error-prone decision-making task. Techniques of the present invention automate these decisions, and in preferred embodiments, a WAS initially proposes content for distribution and the target CP servers then make the final decision. This approach enables the decision to be made using the most up-to-date and accurate information.

Note that while information gathered when monitoring operations of a LB server, CP server, or WAS using a tool such as TWA may be stored in a data warehouse such as TEDW in the prior art, the prior art does not teach using that stored information to make content caching decisions of the type described herein.

Returning again to the discussion of FIG. 4, if the CP server determines at Block 405 that it cannot serve the candidate content, control transfers to Block 420, where a response message indicating a rejection is formatted. (The response message of preferred embodiments is described in more detail below with reference to FIG. 5.) On the other hand, if this CP server can serve this content, processing continues at Block 410.

Blocks 410 and 415 represent a type of refinement of the decision as to whether the CP server can, and should, accept the candidate content. They are presented separately from Block 405 to emphasize that factors considered by preferred embodiments when determining whether to accept content for caching may include content priority. Block 410 tests whether there is sufficient space available in the cache for adding this candidate content. (It is recognized that available cache space may fluctuate rapidly, and Block 410 may therefore be implemented using a tolerance factor rather than performing an exact comparison of content size vs. currently-available space.) If the test in Block 410 has a positive result, then processing continues at Block 425, which is described below. Otherwise, a decision must be made as to whether already-cached content should be replaced with the candidate content, and this decision is represented by Block 415.

The decision made at Block 415 preferably uses historical metrics, such as those noted at element (1) in the list that was discussed above with reference to Block 405. For example, metrics from which historical popularity or priority of the candidate content can be determined, and/or metrics which can be used to predict anticipated popularity or priority of that content may be evaluated by the CP server. (Alternatively, the CP server may invoke function that is provided for this purpose by another component such as a metric-evaluator component Such a component may be co-located with the CP server, or it may be accessed from another location, including by sending a request message over a network connection to provide the metric-evaluator component with information for use in its computations.)

It should be noted that while the second aspect of the present invention uses factors such as those described with reference to Blocks 405–415 to determine whether to accept or reject the candidate content, an implementation of the first aspect may be provided separately from this second aspect, and the accept/reject decision made by a CP server in such an implementation may be based upon other factors. For example, a prior art content replacement algorithm, such as a least-frequently used ("LFU") or least-recently used ("LRU") or other aging algorithm, may be used for this purpose.

If the evaluation performed at Block 415 indicates that there is no already-cached content that is suitable for replacing with the candidate content, then a rejection message is created at Block 420, as discussed above. Otherwise, preferred embodiments of this second aspect preferably remember which content was deemed replaceable (Block 430), after which processing continues at Block 425.

Block 425 formats a response message signifying acceptance of the request to dynamically distribute content. Block 435 sends, to the requesting WAS, either the acceptance response generated at Block 425 or the rejection response generated at Block 420, after which the processing of the current request message by the CP server ends.

Figure 5:
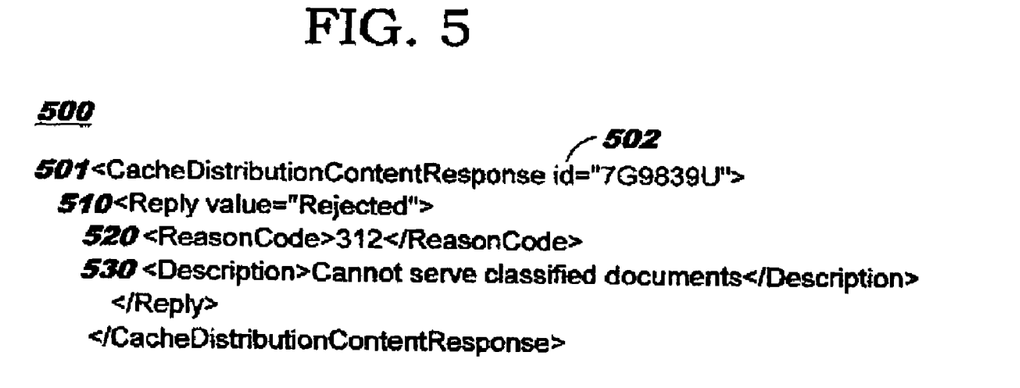

FIG. 5 depicts a sample format and syntax for the response messages sent in Block 435. As shown therein, the response is preferably encoded in a markup language, as has been discussed with reference to the request message depicted in FIG. 3. In this case, an element 501, which for purposes of illustration is named "CacheDistributionContentResponse", is used to encode the response 500. Preferably, an attribute 502 of this element specifies the same content identifier value received on the request message. (See element 302 of FIG. 3.) In this manner, the WAS can efficiently determine what content it should distribute to an accepting CP server.

A child element is used in the sample syntax of FIG. 5 for encoding the accepted/rejected indication, and in the example, this child element is named "Reply" 510 and has a "value" attribute with which the accepted/rejected indication is specified. When the value of this attribute indicates a rejection, as shown in the example, additional child elements may optionally be used to specify one or more reason codes for the rejection. For example, a numeric code may be provided using a child element such as "ReasonCode" 520 and/or a textual description may be provided using a child element such as "Description" 530. In the example, the CP server is shown as having rejected the candidate content because this CP server cannot serve classified documents.

As noted above with reference to Blocks 240 and 245 of FIG. 2, the WAS may try contacting a different CP server upon receiving a rejection response.

Once the WAS receives a response message having an acceptance indication, it sends the accepted content to the CP server, as stated above with reference to Block 235 of FIG. 2. When the CP server receives that content (or, alternatively, during the processing of Blocks 415 and 430 of FIG. 4), the CP server must decide where the content will be placed. In addition, a decision may be made regarding how the content will subsequently be served to requesters. The historical metrics previously discussed are preferably used, and by comparing this new content to the previously-cached content at this CP server, the new content can be prioritized. This priority may be used by the CP server to determine optimal allocation of resources, such as one or more of the following considerations:

(1) which disk the content should be placed on (e.g., whether the fastest disk should be selected, or the slowest disk, and so forth);
(2) whether the content should stay in memory; or
(3) whether there is other content related to this new content, and if so, whether that related content can be pre-fetched to improve efficiency.

In an optional enhancement, content prioritization can be extended further by grouping content, where this grouped content is referred to herein as a "content bundle". Preferably, these bundles contain associated files that (1) are commonly downloaded together by clients; (2) have the highest hit rates; and/or (3) are locale-based. As an example of the first scenario, suppose document "A" is a Web page that references embedded image files "B" and "C". These files A, B, and C may be bundled together and treated as a single unit for which a caching decision will be made (and, optionally, as a single unit to be cached), in order to improve efficiency. As an example of the second scenario, a CP server may be asked, using the negotiation technique described above, to make a caching decision regarding a group of frequently-requested documents (even though those documents are not related to one another). As an example of the third scenario, historical metrics may indicate that clients of particular edge servers tend to request certain content (or certain types of content). The WAS may use this information to proactively request a CP server to decide whether to cache that content, effectively requesting the CP server to pre-load its cache to attempt a reduction of cache misses (which, in turn, will improve efficiency).

Figure 6:
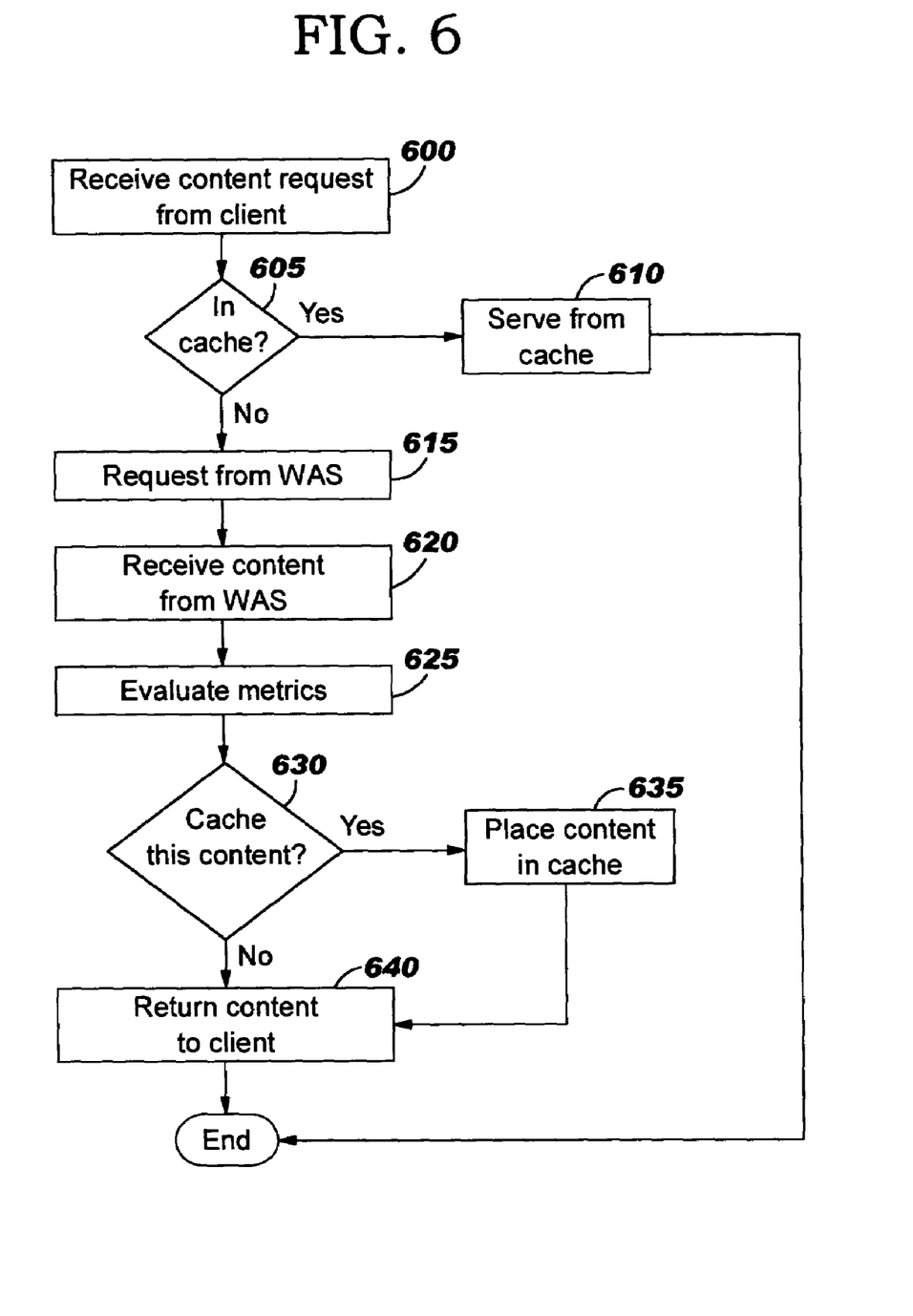
FIG. 6 provides a flowchart illustrating logic that may be used at a caching proxy server to selectively cache content when a cache miss occurs.

Referring now to FIG. 6, a flowchart is provided that illustrates logic which may be used at a caching proxy server, according to the third aspect of the present invention, to selectively cache content when processing a cache miss. As has been described earlier, when a cache miss occurs in the prior art, the content is delivered to the CP server, for delivery to the requesting client, and the CP server also stores that content in local cache. This may be inefficient if higher-hit-rate content is dropped from the local cache to make room for newly-added low-hit-rate content. Using techniques of the present invention, on the other hand, a CP server selectively decides whether it should cache the cache-miss content or whether that content should simply be returned to the requester without being cached.

At Block 600, a client's content request is received at the CP server. Block 605 tests whether the requested content is already available from the local cache. If so, it is served (Block 610) to the client as in the prior art, and the processing of FIG. 6 ends. Otherwise, a request for the content is sent from the CP server to a WAS (Block 615). Upon receiving the requested content (Block 620), the CP server (or an evaluator component invoked therefrom, as discussed with reference to Block 415) evaluates metrics (Block 625) to determine whether it will be advantageous to store this content in the local cache. Historical metrics related to past client requests may be used for this purpose. In addition or instead, information about the CP server's resources (as has been discussed above) may be used for this purpose. The CP server thereby makes an intelligent decision (Block 630) as to whether it will keep this newly-retrieved content in its local cache (Block 635) or just return that content to the client (Block 640) without caching it. The processing of FIG. 6 then ends for this client request.

As has been described, the present invention provides a number of improvements over prior art content caching techniques. The three aspects described herein may be implemented separately, or in various combinations. Operation of the function described herein may occur at alternative locations in some cases, and therefore the description of preferred embodiments is to be interpreted as illustrative but not limiting. For example, while FIG. 2 was described with reference to a Web/application server, this function may alternatively be performed by a different entity, such as a content distribution server or other content source. Techniques disclosed herein may be used advantageously in a number of different types of distributed computing environments, and thus preferred embodiments have been described with reference to Web servers by way of illustration and not of limitation. While the cache store which is the location of potential content caching has been referred to herein as a CP server, this is for purposes of illustration but not of limitation.

Commonly-assigned U.S. patent application Ser. No. 09/670,753 (now U.S. Pat. No. 6,678,793), "User-Based Selective Cache Content Replacement Technique" (filed Sep. 27, 2000) discloses techniques for selectively replacing cached content (including, but not limited to, dynamically generated Web pages which have been cached) to provide a higher level of service to particular users or groups of users. This commonly-assigned invention does not disclose use of negotiation or requests for dynamic content distribution, which are disclosed by the present invention, nor does it discuss use of historical metrics or other factors for responding to such requests. Furthermore, it does not disclose selectively determining whether to cache content in a cache-miss situation, which has been disclosed herein.

Techniques disclosed herein may also be used advantageously in methods of doing business, for example by providing improved cache content management for customers. As an example of how this may be provided, a service may be offered that (1) evaluates what content may potentially be proactively distributed to one or more CP servers and sends content distribution requests to those CP servers, and/or (2) provides, for a CP server receiving a content distribution request, an evaluation of factors to determine whether it may be advantageous for that CP server to accept the candidate content for caching. Typically, a fee will be charged for carrying out the evaluation(s). The fee for this improved cache content management may be collected under various revenue models, such as pay-per-use billing, monthly or other periodic billing, and so forth.

As will be appreciated by one of skill in the art, embodiments of the present invention may be provided as methods, systems, or computer program products. Accordingly, the present invention may take the form of an entirely hardware embodiment, an entirely software embodiment, or an embodiment combining software and hardware aspects. Furthermore, the present invention may take the form of a computer program product which is embodied on one or more computer-readable storage media (including, but not limited to, disk storage, CD-ROM, optical storage, and so forth) having computer-readable program code or instructions embodied therein.

The present invention has been described with reference to flowchart illustrations and/or block diagrams usable in methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions, which may be stored on one or more computer-readable media, may be provided to a processor of a general purpose computer, special purpose computer, embedded processor, or other programmable data processing apparatus to produce a machine, such that the instructions, which execute via the processor of the computer or other programmable data processing apparatus, create computer-readable program code means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

While preferred embodiments of the present invention have been described, additional variations and modifications in those embodiments may occur to those skilled in the art once they learn of the basic inventive concepts. Therefore, it is intended that the appended claims shall be construed to include preferred embodiments and all such variations and modifications as fall within the spirit and scope of the invention.

What is claimed is:

1. A method of selectively accepting content for caching, comprising steps of:
    receiving, at a cache store, a request message inquiring whether the cache store will accept particular content for caching;
    deciding, responsive to receiving the request message, whether the cache store will accept or reject the particular content; and
    sending, from the cache store, a response to the request message, wherein the response indicates the cache store's decision.

2. The method according to claim 1, further comprising the step of:
    subsequently receiving, at the cache store, the particular content only if the response indicated that the cache store's decision was to accept the particular content.

3. The method according to claim 1, wherein the request message describes the particular content.

4. The method according to claim 3, wherein the deciding step uses the description.

5. The method according to claim 1, wherein the request message specifies the particular content's size, and wherein the deciding step further comprises deciding whether content of that size may be advantageously cached by the cache store.

6. The method according to claim 1, wherein the request message specifies the particular content's type, and wherein the deciding step further comprises deciding whether content of that type may be advantageously cached by the cache store.

7. The method according to claim 1, wherein the request message specifies the particular content's security classification, and wherein the deciding step further comprises deciding whether content of that security classification may be advantageously cached by the cache store.

8. The method according to claim 1, wherein the request message specifies the particular content's hit rate, and wherein the deciding step further comprises deciding whether content having that hit rate may be advantageously cached by the cache store.

9. The method according to claim 1, wherein the request message specifies the particular content's hit rate, and wherein the deciding step further comprises deciding whether that hit rate is higher than bit rates associated with other content already cached by the cache store and if so, deciding to accept the particular content.

10. The method according to claim 1, wherein the deciding step considers historical metrics associated with the particular content.

11. The method according to claim 1, wherein the deciding step considers resources of the cache store.

12. The method according to claim 1, wherein the deciding step considers currently-available resources of the cache store.

13. The method according to claim 1, wherein the request message and the response are encoded in a structured markup language.

14. The method according to claim 13, wherein the structured markup language is Extensible Markup Language ("XML").

15. The method according to claim 1, wherein the request message includes an identifier of the particular content and wherein the identifier is also included in the response.

16. The method according to claim 1, wherein the deciding step compares a priority associated with the particular content to priorities associated with already-cached content.

17. The method according to claim 2, further comprising the step of storing the subsequently-received particular content at the cache store.

18. The method according to Claim 2, further comprising the steps of:
   remembering, when the deciding step decides to accept the particular content, which already-cached content will be replaced with the particular content; and
   storing the subsequently-received particular content at the cache store while replacing the remembered content.

19. A system for selectively accepting content for caching, comprising:
   means for receiving, at a cache store, a request message inquiring whether the cache store will accept particular content for caching;
   means for deciding, responsive to receiving the request message, whether the cache store will accept or reject the particular content; and
   means for sending, from the cache store, a response to the request message, wherein the response indicates the cache store's decision.

20. The system according to claim 19, further comprising:
   means for subsequently receiving, at the cache store, the particular content only if the response indicated that the cache store's decision was to accept the particular content.

21. The system according to claim 19, wherein the request message specifies the particular content's size, and wherein the means for deciding further comprises means for deciding whether content of that size may be advantageously cached by the cache store.

22. The system according to claim 19, wherein the request message specifies the particular content's type, and wherein the means for deciding further comprises means for deciding whether content of that type may be advantageously cached by the cache store.

23. The system according to claim 19, wherein the request message specifies the particular content's security classification, and wherein the means for deciding further comprises means for deciding whether content of that security classification may be advantageously cached by the cache store.

24. A computer program product for selectively accepting content for caching, the computer program product embodied on one or more computer-readable media and comprising:
   computer-readable program code for receiving, at a cache store, a request message inquiring whether the cache store will accept particular content for caching;
   computer-readable program code for deciding, responsive to receiving the request message, whether the cache store will accept or reject the particular content; and
   computer-readable program code for sending, from the cache store, a response to the request message, wherein the response indicates the cache store's decision.

25. The computer program product according to claim 24, further comprising:
   computer-readable program code for subsequently receiving, at the cache store, the particular content only if the response indicated that the cache store's decision was to accept the particular content.

26. The computer program product according to claim 24, wherein the request message specifies the particular content's hit rate, and wherein the computer-readable program code for deciding further comprises computer-readable program code for deciding whether content having that hit rate may be advantageously cached by the cache store.

27. The computer program product according to claim 24, wherein the request message specifies the particular content's hit rate, and wherein the computer-readable program code for deciding further comprises computer-readable program code for deciding whether that hit rate is higher than hit rates associated with other content already cached by the cache store and if so, deciding to accept the particular content.

* * * * *

UNITED STATES PATENT AND TRADEMARK OFFICE
CERTIFICATE OF CORRECTION

| | | |
|---|---|---|
| PATENT NO. | : 7,085,894 B2 | Page 1 of 1 |
| APPLICATION NO. | : 10/662210 | |
| DATED | : August 1, 2006 | |
| INVENTOR(S) | : Krissell et al. | |

It is certified that error appears in the above-identified patent and that said Letters Patent is hereby corrected as shown below:

Column 12,
Line 60, change "than bit rates" to -- than hit rates --.

Signed and Sealed this

Third Day of October, 2006

JON W. DUDAS
*Director of the United States Patent and Trademark Office*